US009488398B2

(12) United States Patent
Rached

(10) Patent No.: US 9,488,398 B2
(45) Date of Patent: Nov. 8, 2016

(54) TERNARY HEAT-TRANSFER FLUIDS COMPRISING DIFLUOROMETHANE, PENTAFLUOROETHANE AND TETRAFLUOROPROPENE

(71) Applicant: ARKEMA FRANCE, Colombes (FR)

(72) Inventor: Wissam Rached, Chaponost (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 15/150,889

(22) Filed: May 10, 2016

(65) Prior Publication Data

US 2016/0252283 A1    Sep. 1, 2016

Related U.S. Application Data

(63) Continuation of application No. 14/645,066, filed on Mar. 11, 2015, now Pat. No. 9,359,540, which is a continuation of application No. 13/696,870, filed as application No. PCT/FR2011/050882 on Apr. 18, 2011, now Pat. No. 9,057,010.

(30) Foreign Application Priority Data

May 11, 2010 (FR) ..................................... 10 53671

(51) Int. Cl.
*C09K 5/04* (2006.01)
*F25B 45/00* (2006.01)

(52) U.S. Cl.
CPC .............. *F25B 45/00* (2013.01); *C09K 5/045* (2013.01); *C09K 2205/122* (2013.01); *C09K 2205/126* (2013.01); *C09K 2205/22* (2013.01); *C09K 2205/40* (2013.01)

(58) Field of Classification Search
CPC ............ C09K 5/045; C09K 2205/126; C09K 2205/122; F25B 1/00
USPC ................................ 252/67, 68; 62/467, 468
See application file for complete search history.

(56) References Cited

U.S. PATENT DOCUMENTS

| 2,438,120 | A | 3/1948 | Freygang |
| 2,834,748 | A | 5/1958 | Bailey et al. |
| 2,846,458 | A | 8/1958 | Haluska et al. |
| 2,917,480 | A | 12/1959 | Bailey et al. |
| 5,399,631 | A | 3/1995 | Egawa et al. |
| 5,497,631 | A | 3/1996 | Lorentzen et al. |
| 5,643,492 | A | 7/1997 | Shiflett |
| 5,688,432 | A | 11/1997 | Pearson |
| 5,722,256 | A | 3/1998 | Shiflett |
| 5,744,052 | A | 4/1998 | Bivens |
| 6,454,960 | B1 | 9/2002 | Sunaga et al. |
| 6,508,950 | B1 | 1/2003 | Lim et al. |
| 6,589,355 | B1 | 7/2003 | Thomas et al. |
| 6,655,160 | B2 | 12/2003 | Roberts |
| 7,914,696 | B2 | 3/2011 | Low et al. |
| 8,070,977 | B2 | 12/2011 | Rached |
| 8,075,798 | B2 | 12/2011 | Rached |
| 8,142,680 | B2 | 3/2012 | Rached |
| 8,246,850 | B2 | 8/2012 | Rached |
| 8,443,624 | B2 | 5/2013 | Yamashita et al. |
| 8,496,845 | B2 | 7/2013 | Tsuchiya et al. |
| 9,057,010 | B2 | 6/2015 | Rached |
| 9,359,540 | B2 * | 6/2016 | Rached .................. C09K 5/045 |
| 2006/0025322 | A1 | 2/2006 | Wilson et al. |
| 2006/0243944 | A1 | 11/2006 | Minor et al. |
| 2006/0243945 | A1 | 11/2006 | Minor et al. |
| 2006/0269484 | A1 | 11/2006 | Knopeck et al. |
| 2007/0108403 | A1 | 5/2007 | Sievert et al. |
| 2008/0230738 | A1 | 9/2008 | Minor et al. |
| 2009/0158771 | A1 | 6/2009 | Low et al. |
| 2009/0249864 | A1 | 10/2009 | Minor et al. |
| 2009/0250650 | A1 | 10/2009 | Minor et al. |
| 2009/0278072 | A1 | 11/2009 | Minor |
| 2009/0305876 | A1 | 12/2009 | Singh et al. |
| 2010/0044619 | A1 | 2/2010 | Hulse et al. |
| 2010/0044620 | A1 | 2/2010 | Rached |
| 2010/0122545 | A1 | 5/2010 | Minor et al. |
| 2011/0079042 | A1 | 4/2011 | Yamashita et al. |

(Continued)

FOREIGN PATENT DOCUMENTS

| EP | 0 509 673 A1 | 10/1992 |
| EP | 0 811 670 A1 | 12/1997 |

(Continued)

OTHER PUBLICATIONS

Third Party Observation mailed on May 26, 2014, by the European Patent Office in corresponding European Patent Application No. 11731420.3. (4 pages).
Takizawa, K., et al., "Flammability Assessment of $CH_2=CFCF_3$: Comparison with Fluoroalkenes and Fluoroalkanes", Journal of Hazardous Materials, vol. 172, No. 2-3, Aug. 18, 2009, pp. 1329-1338, XP026719989, Elsevier B.V.
"Definitions: Humidity," Healthy Heating, May 18, 2008, 4 pages, XP002594956, http://web.archive.org/web/20080518174151/http://www.healthyheating.com/Thermal_Comfort_Working_Copy/Definitions/humidity.htm.
International Search Report issued in PCT/FR2011/050882 (French and English-language versions), mailed Dec. 28, 2011, 5 pages, European Patent Office, Rijswijk, NL.

(Continued)

*Primary Examiner* — Douglas McGinty
(74) *Attorney, Agent, or Firm* — Buchanan Ingersoll & Rooney P.C.

(57) ABSTRACT

A ternary composition including: from 5 to 50% of difluoromethane; from 2 to 20% of pentafluoroethane; and from 30 to 90% of tetrafluoropropene. The tetrafluoropropene may be 1,3,3,3-tetrafluoropropene or 2,3,3,3-tetrafluoropropene. This composition can be used as a heat-transfer fluid in vapor compression circuit. A process for heating or cooling a fluid or a body using a vapor compression circuit containing a heat transfer fluid, said process successively including evaporation of the heat transfer fluid, compression of the heat transfer fluid, condensation of the heat fluid and depressurization of the heat transfer fluid, in which the heat transfer fluid is a composition as described.

18 Claims, No Drawings

(56) References Cited

U.S. PATENT DOCUMENTS

| | | |
|---|---|---|
| 2011/0095224 A1 | 4/2011 | Rached |
| 2011/0108756 A1 | 5/2011 | Tsuchiya et al. |
| 2011/0162410 A1 | 7/2011 | Low |
| 2011/0173997 A1 | 7/2011 | Low et al. |
| 2011/0186772 A1 | 8/2011 | Rached |
| 2011/0219792 A1 | 9/2011 | Rached |
| 2011/0219815 A1 | 9/2011 | Motta et al. |
| 2011/0240254 A1 | 10/2011 | Rached |
| 2011/0284181 A1 | 11/2011 | Rached |
| 2012/0049104 A1 | 3/2012 | Rached |
| 2012/0056123 A1 | 3/2012 | Rached |
| 2012/0097885 A9 | 4/2012 | Hulse et al. |
| 2012/0144857 A1 | 6/2012 | Rached |
| 2012/0151959 A1 | 6/2012 | Rached |
| 2012/0153213 A1 | 6/2012 | Rached |
| 2012/0159982 A1 | 6/2012 | Rached |
| 2012/0161064 A1 | 6/2012 | Rached |
| 2012/0167615 A1 | 7/2012 | Rached |
| 2012/0255316 A1 | 10/2012 | Andre et al. |
| 2012/0312048 A1 | 12/2012 | Poole et al. |
| 2013/0055733 A1 | 3/2013 | Rached |
| 2013/0055738 A1 | 3/2013 | Rached |
| 2013/0055739 A1 | 3/2013 | Rached |
| 2013/0061613 A1 | 3/2013 | Rached |
| 2013/0096218 A1 | 4/2013 | Rached |
| 2013/0145778 A1 | 6/2013 | Motta et al. |
| 2013/0193369 A1 | 8/2013 | Low |
| 2013/0255284 A1 | 10/2013 | Rached |
| 2014/0075969 A1 | 3/2014 | Guerin et al. |
| 2014/0137578 A1 | 5/2014 | Motta et al. |
| 2014/0223927 A1 | 8/2014 | Pottker et al. |
| 2015/0135765 A1 | 5/2015 | Yana Motta et al. |
| 2015/0184052 A1 | 7/2015 | Rached |
| 2015/0291869 A1 | 10/2015 | Boussand |
| 2016/0222272 A1 | 8/2016 | Rached |

FOREIGN PATENT DOCUMENTS

| | | |
|---|---|---|
| KR | 2001-0044992 A | 6/2001 |
| WO | WO 2004/037913 A2 | 5/2004 |
| WO | WO 2004/037913 A3 | 5/2004 |
| WO | WO 2005/105947 A2 | 11/2005 |
| WO | WO 2005/105947 A3 | 11/2005 |
| WO | WO 2007/002625 A2 | 1/2007 |
| WO | WO 2007/053697 A2 | 5/2007 |
| WO | WO 2007/053697 A3 | 5/2007 |
| WO | WO 2007/126414 A2 | 11/2007 |
| WO | WO 2007/126414 A3 | 11/2007 |
| WO | WO 2009/047542 A1 | 4/2009 |
| WO | WO 2009/151669 A1 | 12/2009 |
| WO | WO 2009/154149 A1 | 12/2009 |
| WO | WO/2010/059677 A2 | 5/2010 |
| WO | WO 2010/064005 A1 | 6/2010 |
| WO | WO 2010/002014 A | 10/2010 |
| WO | WO 2010/129461 A2 | 11/2010 |
| WO | WO 2010/129920 A1 | 11/2010 |
| WO | WO 2011/073934 A1 | 6/2011 |
| WO | WO 2011/077088 A1 | 6/2011 |
| WO | WO 2011/107698 A2 | 9/2011 |
| WO | WO 2011/107698 A3 | 9/2011 |
| WO | WO 2011/141654 A2 | 11/2011 |
| WO | WO 2011/141654 A3 | 11/2011 |
| WO | WO 2011/141656 A2 | 11/2011 |
| WO | WO 2011/141656 A3 | 11/2011 |

OTHER PUBLICATIONS

Translated Excerpt from official Action issued Mar. 3, 2015 in corresponding Japanese Patent Application No. 2013-0509593, Japan Patent Office, 1 page.

Takizawa, K., et al., "Flammability Assessment of $CH_2=CFCF_3$ (R-1234yf) and its Mixtures with $CH_2F_2$ (R-32); 2010 International Symposium on Next-generation Air Conditioning and Refrigeration Technology," Tokyo, JP, Feb. 17-19, 2010, pp. 1-8.

English Translation of WO 2009/154149, Dec. 23, 2009.

U.S. Appl. No. 14/442,855, Beatrice Boussand, filed May 14, 2015.

U.S. Appl. No. 15/021,463, Wissam Rached, filed Mar. 11, 2016.

U.S. Appl. No. 13/516,796, David Andre, Beatrice Boussand and Wissam Rached, filed Jun. 18, 2012.

U.S. Appl. No. 13/703,061 Wissam Rached, Brett L. Van Horn and Stephen Spletzer, filed Dec. 10, 2012.

* cited by examiner

TERNARY HEAT-TRANSFER FLUIDS COMPRISING DIFLUOROMETHANE, PENTAFLUOROETHANE AND TETRAFLUOROPROPENE

CROSS REFERENCE TO RELATED APPLICATIONS

The present application is a continuation of U.S. application Ser. No. 14/645,066, filed on Mar. 11, 2015, U.S. Pat. No. 9,359,540, which is a continuation of U.S. application Ser. No. 13/696,870, filed on Nov. 8, 2012, now U.S. Pat. No. 9,057,010, which is U.S. National Phase of International Application No. PCT/FR2011/050882, filed on Apr. 18, 2011 claims the benefit of French Application No. 1053671, filed on May 11, 2010. The entire contents of each of U.S. application Ser. No. 14/645,066, U.S. application Ser. No. 13/696,870, U.S. Pat. No. 9,057,010, International Application No. PCT/FR2011/050882, and French Application No. 1053671 are hereby incorporated herein by reference in their entirety.

FIELD OF THE INVENTION

The present invention relates to transfer fluids based on difluoromethane, pentafluoroethane and tetrafluoropropene, which have high performance qualities and a low GWP, and are thus suitable for replacing the usual coolants.

TECHNICAL BACKGROUND

Fluids based on fluorocarbon compounds are widely used in vapor-compression heat transfer systems, especially air-conditioning, heat-pump, refrigerator or freezer devices. The common feature of these devices is that they are based on a thermodynamic cycle comprising vaporization of the fluid at low pressure (in which the fluid absorbs heat); compression of the vaporized fluid up to a high pressure; condensation of the vaporized fluid to liquid at high pressure (in which the fluid expels heat); and depressurization of the fluid to complete the cycle.

The choice of a heat transfer fluid (which may be a pure compound or a mixture of compounds) is dictated firstly by the thermodynamic properties of the fluid, and secondly by additional constraints. Thus, a particularly important criterion is the impact of the fluid under consideration on the environment. In particular, chlorinated compounds (chlorofluorocarbons and hydrochlorofluorocarbons) have the drawback of damaging the ozone layer. Non-chlorinated compounds such as hydrofluorocarbons, fluoroethers and fluoroolefins are therefore now generally preferred to chlorinated compounds.

Heat transfer fluids that are currently used are HFC-134a, R404a (ternary mixture of 52% HFC-143a, 44% HFC-125 and 4% HFC-134a) and R407c (ternary mixture of 52% HFC-134a, 25% HFC-125 and 23% HFC-32).

It is, however, necessary to develop other heat transfer fluids that have a lower global warming potential (GWP) than that of the above fluids, and which have equivalent and preferably improved performance qualities.

Document US 2009/0 250 650 describes various fluoroolefin-based compositions and their use as heat transfer fluids. In particular, the document describes the mixture consisting of HFC-32, HFC-125 and HFO-1234ze and also the mixture consisting of HFC-32, HFC-125 and HFO-1234yf. The compositions indicated as being preferred are the following:

23% HFC-32, 25% HFC-125 and 52% HFO-1234ze;
30% HFC-32, 50% HFC-125 and 20% HFO-1234ze;
40% HFC-32, 50% HFC-125 and 10% HFO-1234yf;
23% HFC-32, 25% HFC-125 and 52% HFO-1234yf;
15% HFC-32, 45% HFC-125 and 40% HFO-1234yf; and
10% HFC-32, 60% HFC-125 and 30% HFO-1234yf.

Document WO 2010/002 014 describes a non-flammable coolant based on HFC-32, HFC-125 and HFO-1234yf. Several compositions are disclosed and especially that comprising 15% HFC-32, 25% HFC-125 and 60% HFO-1234yf.

However, there is still a need to develop other heat transfer fluids that have a relatively low GWP and that have better energy performance qualities than the heat transfer fluids of the prior art.

SUMMARY OF THE INVENTION

The invention relates firstly to a ternary composition comprising:
  from 5% to 50% of difluoromethane;
  from 2% to 20% of pentafluoroethane; and
  from 30% to 90% of tetrafluoropropene.

According to one embodiment, the tetrafluoropropene is 1,3,3,3-tetrafluoropropene.

According to another embodiment, the tetrafluoropropene is 2,3,3,3-tetrafluoropropene.

According to one embodiment, the composition comprises:
  from 15% to 35% of difluoromethane;
  from 5% to 20% of pentafluoroethane; and
  from 45% to 80% of 2,3,3,3-tetrafluoropropene;
  and preferably:
  from 18% to 25% of difluoromethane;
  from 8% to 20% of pentafluoroethane; and
  from 55% to 74% of 2,3,3,3-tetrafluoropropene.

According to one embodiment, the composition comprises:
  from 15% to 50% of difluoromethane;
  from 5% to 20% of pentafluoroethane; and
  from 30% to 80% of 1,3,3,3-tetrafluoropropene;
  and preferably:
  from 30% to 40% of difluoromethane;
  from 8% to 20% of pentafluoroethane; and
  from 40% to 62% of 1,3,3,3-tetrafluoropropene.

According to one embodiment, the composition comprises:
  from 5% to 30% of difluoromethane;
  from 5% to 20% of pentafluoroethane; and
  from 50% to 90% of 1,3,3,3-tetrafluoropropene;
  and preferably:
  from 5% to 20% of difluoromethane;
  from 5% to 20% of pentafluoroethane; and
  from 60% to 90% of 1,3,3,3-tetrafluoropropene.

According to one embodiment, the composition comprises:
  from 20% to 40% of difluoromethane;
  from 5% to 20% of pentafluoroethane; and
  from 40% to 75% of 1,3,3,3-tetrafluoropropene;
  and preferably:
  from 25% to 40% of difluoromethane;
  from 5% to 20% of pentafluoroethane; and
  from 40% to 70% of 1,3,3,3-tetrafluoropropene.

The invention also relates to the use of the abovementioned ternary composition as a heat transfer fluid in a vapor compression circuit.

The invention also relates to a heat transfer composition comprising the abovementioned ternary composition as a heat transfer fluid, and one or more additives chosen from lubricants, stabilizers, surfactants, tracer agents, fluorescers, odorants and solubilizers, and mixtures thereof.

The invention also relates to a heat transfer installation comprising a vapor compression circuit containing the abovementioned ternary composition as a heat transfer fluid, or containing an abovementioned heat transfer composition.

According to one embodiment, this installation is chosen from mobile or stationary heat-pump heating, air-conditioning, refrigeration and freezing installations.

The invention also relates to a process for heating or cooling a fluid or a body using a vapor compression circuit containing a heat transfer fluid, said process successively comprising evaporation of the heat transfer fluid, compression of the heat transfer fluid, condensation of the heat fluid and depressurization of the heat transfer fluid, and the heat transfer fluid being the abovementioned ternary composition.

According to one embodiment of the heating or cooling process, this process is a process for cooling a fluid or a body, in which the temperature of the cooled fluid or body is from −40° C. to −10° C., preferably from −35° C. to −25° C. and more particularly preferably from −30° C. to −20° C., and in which the heat transfer fluid comprises:

from 15% to 35% of difluoromethane, from 5% to 20% of pentafluoroethane and from 45% to 80% of 2,3,3,3-tetrafluoropropene, preferably from 18% to 25% of difluoromethane, from 8% to 20% of pentafluoroethane and from 55% to 74% of 2,3,3,3-tetrafluoropropene; or from 15% to 50% of difluoromethane, from 5% to 20% of pentafluoroethane and from 30% to 80% of 1,3,3,3-tetrafluoropropene, preferably from 30% to 40% of difluoromethane, from 8% to 20% of pentafluoroethane and from 40% to 62% of 1,3,3,3-tetrafluoropropene.

According to another embodiment of the heating or cooling process, this process is a process for cooling a fluid or a body, in which the temperature of the cooled fluid or body is from −15° C. to 15° C., preferably from −10° C. to 10° C. and more particularly preferably from −5° C. to 5° C., and in which the heat transfer fluid comprises:

from 15% to 35% of difluoromethane, from 5% to 20% of pentafluoroethane and from 45% to 80% of 2,3,3,3-tetrafluoropropene, preferably from 18% to 25% of difluoromethane, from 8% to 20% of pentafluoroethane and from 55% to 74% of 2,3,3,3-tetrafluoropropene; or from 5% to 30% of difluoromethane, from 5% to 20% of pentafluoroethane and from 50% to 90% of 1,3,3,3-tetrafluoropropene, preferably from 5% to 20% of difluoromethane, from 5% to 20% of pentafluoroethane and from 60% to 90% of 1,3,3,3-tetrafluoropropene; or from 20% to 40% of difluoromethane, from 5% to 20% of pentafluoroethane and from 40% to 75% of 1,3,3,3-tetrafluoropropene, preferably from 25% to 40% of difluoromethane, from 5% to 20% of pentafluoroethane and from 40% to 70% of 1,3,3,3-tetrafluoropropene.

According to another embodiment of the heating or cooling process, this process is a process for heating a fluid or a body, in which the temperature of the heated fluid or body is from 30° C. to 80° C., preferably from 35° C. to 55° C. and more particularly preferably from 40° C. to 50° C., and in which the heat transfer fluid comprises:

from 15% to 35% of difluoromethane, from 5% to 20% of pentafluoroethane and from 45% to 80% of 2,3,3,3-tetrafluoropropene, preferably from 18% to 25% of difluoromethane, from 8% to 20% of pentafluoroethane and from 55% to 74% of 2,3,3,3-tetrafluoropropene; or from 5% to 30% of difluoromethane, from 5% to 20% of pentafluoroethane and from 50% to 90% of 1,3,3,3-tetrafluoropropene, preferably from 5% to 20% of difluoromethane, from 5% to 20% of pentafluoroethane and from 60% to 90% of 1,3,3,3-tetrafluoropropene; or from 20% to 40% of difluoromethane, from 5% to 20% of pentafluoroethane and from 40% to 75% of 1,3,3,3-tetrafluoropropene, preferably from 25% to 40% of difluoromethane, from 5% to 20% of pentafluoroethane and from 40% to 70% of 1,3,3,3-tetrafluoropropene.

The invention also relates to a process for reducing the environmental impact of a heat transfer installation comprising a vapor compression circuit containing an initial heat transfer fluid, said process comprising a step of replacing the initial heat transfer fluid in the vapor compression circuit with a final transfer fluid, the final heat transfer fluid having a lower GWP than the initial heat transfer fluid, in which the final heat transfer fluid is the abovementioned ternary composition.

According to one embodiment of this process for reducing the environmental impact, the initial heat transfer fluid is a ternary mixture of 52% of 1,1,1-trifluoroethane, 44% of pentafluoroethane and 4% of 1,1,1,2-tetrafluoroethane or a ternary mixture of 52% of 1,1,1,2-tetrafluoroethane, 25% of pentafluoroethane and 23% of difluoromethane, and the final heat transfer fluid comprises:

from 15% to 35% of difluoromethane, from 5% to 20% of pentafluoroethane and from 45% to 80% of 2,3,3,3-tetrafluoropropene, preferably from 18% to 25% of difluoromethane, from 8% to 20% of pentafluoroethane and from 55% to 74% of 2,3,3,3-tetrafluoropropene; or from 15% to 50% of difluoromethane, from 5% to 20% of pentafluoroethane and from 30% to 80% of 1,3,3,3-tetrafluoropropene, preferably from 30% to 40% of difluoromethane, from 8% to 20% of pentafluoroethane and from 40% to 62% of 1,3,3,3-tetrafluoropropene; or from 20% to 40% of difluoromethane, from 5% to 20% of pentafluoroethane and from 40% to 75% of 1,3,3,3-tetrafluoropropene, preferably from 25% to 40% of difluoromethane, from 5% to 20% of pentafluoroethane and from 40% to 70% of 1,3,3,3-tetrafluoropropene.

According to another embodiment of this process for reducing the environmental impact, the initial heat transfer fluid is 1,1,1,2-tetrafluoroethane and the final heat transfer fluid comprises:

from 5% to 30% of difluoromethane, from 5% to 20% of pentafluoroethane and from 50% to 90% of 1,3,3,3-tetrafluoropropene, preferably from 5% to 20% of difluoromethane, from 5% to 20% of pentafluoroethane and from 60% to 90% of 1,3,3,3-tetrafluoropropene.

The present invention makes it possible to overcome the drawbacks of the prior art. It more particularly provides heat transfer fluids with a relatively low GWP, which have better energy performance qualities than the known heat transfer fluids.

This is accomplished by means of ternary mixtures comprising HFC-32, HFC-125 and tetrafluoropropene in the proportions indicated above.

According to certain particular embodiments, the invention also has one or preferably several of the advantageous features listed below.

The heat transfer fluids of the invention have a performance coefficient higher than the reference coolants R404a, R407c and/or HFC-134, in the same type of applications.

The capacity of the heat transfer fluids of the invention is greater than or equal to that of the reference coolants, in the same type of applications. Correlatively, the invention makes it possible to reduce the GWP of existing systems comprising one of the above reference coolants, and to do so while improving to a large extent the performance qualities of these systems, by replacing the reference coolants with the heat transfer fluids of the invention.

The heat transfer fluids of the invention have a performance coefficient greater than that of the ternary mixtures of HFC-32, HFC-125 and HFO-1234ze or HFO-1234yf which are described in documents US 2009/0 250 650 and WO 2010/002 014.

Certain heat transfer fluids according to the invention make it possible to obtain a compressor outlet temperature which is lower than that obtained with the heat transfer fluids of the prior art.

According to the invention, the global warming potential (GWP) is defined relative to carbon dioxide and relative to a duration of 100 years, according to the method indicated in "The scientific assessment of ozone depletion, 2002, a report of the World Meteorological Association's Global Ozone Research and Monitoring Project".

DESCRIPTION OF EMBODIMENTS OF THE INVENTION

The invention is now described in greater detail and in a non-limiting manner in the description that follows.

The term "heat transfer compound" or, respectively, "heat transfer fluid" (or coolant fluid) means a compound or, respectively, a fluid which is capable of absorbing heat by evaporating at low temperature and low pressure and of expelling heat by condensing at high temperature and high pressure, in a vapor compression circuit. In general, a heat transfer fluid may comprise only one, two, three or more than three heat transfer compounds.

The term "heat transfer composition" means a composition comprising a heat transfer fluid and optionally one or more additives that are not heat transfer compounds for the envisioned application.

The heat transfer process according to the invention is based on the use of an installation comprising a vapor compression circuit which contains a heat transfer fluid. The heat transfer process may be a process for heating or cooling a fluid or a body.

The vapor compression circuit containing a heat transfer fluid comprises at least one evaporator, a compressor, a condenser and a pressure reducer, and also lines for transporting heat transfer fluid between these elements. The evaporator and the condenser comprise a heat exchanger that allows heat exchange between the heat transfer fluid and another fluid or body.

As compressor, use may be made especially of a centrifugal compressor containing one or more stages or a centrifugal minicompressor. Rotary, piston or screw compressors may also be used. The compressor may be driven by an electric motor or by a gas turbine (for example fed with a vehicle's exhaust gases, for mobile applications) or by gearing.

The installation may comprise a turbine for generating electricity (Rankine cycle).

The installation may also optionally comprise at least one heat transfer fluid circuit used for transmitting heat (with or without a change of state) between the heat transfer fluid circuit and the fluid or body to be heated or cooled.

The installation may also optionally comprise two (or more) vapor compression circuits, containing identical or different heat transfer fluids. For example, the vapor compression circuits may be coupled together.

The vapor compression circuit operates according to a standard vapor compression cycle. The cycle comprises change of state of the heat transfer fluid from a liquid phase (or two-phase liquid/vapor) to a vapor phase at a relatively low pressure, and then compression of the fluid in the vapor phase to a relatively high pressure, change of state (condensation) of the heat transfer fluid from the vapor phase to the liquid phase at a relatively high pressure, and reduction of the pressure to recommence the cycle.

In the case of a cooling process, heat derived from the fluid or body that is cooled (directly or indirectly, via a heat transfer fluid) is absorbed by the heat transfer fluid, during its evaporation, at a relatively low temperature relative to the environment. The cooling processes comprise air-conditioning processes (with mobile installations, for example in vehicles, or stationary installations) and refrigeration and freezing or cryogenic processes.

In the case of a heating process, heat is transferred (directly or indirectly, via a heat transfer fluid) from the heat transfer fluid, during its condensation, to the fluid or body that is heated, at a relatively high temperature relative to the environment. The installation for performing the heat transfer is known in this case as a "heat pump".

It is possible to use any type of heat exchanger for the implementation of the heat transfer fluids according to the invention, and especially co-current heat exchangers.

However, according to one preferred embodiment, the invention envisages that the cooling and heating processes, and the corresponding installations, comprise a counter-current heat exchanger, either at the condenser or at the evaporator. Specifically, the heat transfer fluids according to the invention are particularly efficient with counter-current heat exchangers. Preferably, both the evaporator and the condenser comprise a counter-current heat exchanger.

According to the invention, the term "counter-current heat exchanger" means a heat exchanger in which heat is exchanged between a first fluid and a second fluid, the first fluid at the exchanger inlet exchanging heat with the second fluid at the exchanger outlet, and the first fluid at the exchanger outlet exchanging heat with the second fluid at the exchanger inlet.

For example, counter-current heat exchangers comprise devices in which the stream of the first fluid and the stream of the second fluid are in opposite or virtually opposite directions. Exchangers operating in cross-current mode with a counter-current tendency are also included among the counter-current heat exchangers for the purposes of the present application.

The meaning of the various abbreviations used to denote the various chemical compounds mentioned in the application is as follows:

HFC-134a: 1,1,1,2-tetrafluoroethane;
HFC-125: pentafluoroethane;
HFC-32: difluoromethane;
HFO-1234ze: 1,3,3,3-tetrafluoropropene;
HFO-1234yf: 2,3,3,3-tetrafluoropropene.

The heat transfer fluids used in the invention are the following ternary mixtures:

1) HFC-32, HFC-125 and HFO-1234ze; and
2) HFC-32, HFC-125 and HFO-1234yf.

The term "ternary mixture" means a composition consisting essentially of the three mentioned compounds, i.e. in which the three mentioned compounds represent at least 99% (preferably at least 99.5% or even at least 99.9%) of the composition.

Unless otherwise mentioned, throughout the application, the indicated proportions of compounds are given as mass percentages.

HFO-1234ze may be in cis or trans form (preferably trans) or may be a mixture of these two forms.

In the above compositions, HFC-32 is present in an amount of from 5% to 50%, HFC-125 is present in an amount of from 2% to 20% and HFO-1234yf or HFO-1234ze is present in an amount of from 30% to 90%.

For use in low-temperature refrigeration processes, i.e. those in which the temperature of the cooled fluid or body is from −40° C. to −10° C., preferably from −35° C. to −25° C. and more particularly preferably from −30° C. to −20° C. (ideally about −25° C.), it has been found that the compositions that are the most efficient for replacing R404a are the following:

for composition 1): from 15% to 50% HFC-32, from 5% to 20% HFC-125 and from 30% to 80% HFO-1234ze, and preferably from 30% to 40% HFC-32, from 8% to 20% HFC-125 and from 40% to 62% HFO-1234ze;

for composition 2): from 15% to 35% HFC-32, from 5% to 20% HFC-125 and from 45% to 80% HFO-1234yf, and preferably from 18% to 25% HFC-32, from 8% to 20% HFC-125 and from 55% to 74% HFO-1234yf.

For a use in:

cooling processes at moderate temperature, i.e. those in which the temperature of the cooled fluid or body is from −15° C. to 15° C., preferably from −10° C. to 10° C. and more particularly preferably from −5° C. to 5° C. (ideally about 0° C.), and also heating processes at moderate temperature, i.e. those in which the temperature of the heated fluid or body is from 30° C. to 80° C., preferably from 35° C. to 55° C. and more particularly preferably from 40° C. to 50° C. (ideally about 45° C.), it has been found that the compositions that are the most efficient for replacing HFC-134a are the following:

for composition 1): from 5% to 30% HFC-32, from 5% to 20% HFC-125 and from 50% to 90% HFO-1234ze, and preferably from 5% to 20% HFC-32, from 5% to 20% HFC-125 and from 60% to 90% HFO-1234ze.

For a use in:

cooling processes at moderate temperature, i.e. those in which the temperature of the cooled fluid or body is from −15° C. to 15° C., preferably from −10° C. to 10° C. and more particularly preferably from −5° C. to 5° C. (ideally about 0° C.), and also heating processes at moderate temperature, i.e. those in which the temperature of the heated fluid or body is from 30° C. to 80° C., preferably from 35° C. to 55° C. and more particularly preferably from 40° C. to 50° C. (ideally about 45° C.), it has been found that the compositions that are the most efficient for replacing R404a or R407c are the following:

for composition 1): from 20% to 40% HFC-32, from 5% to 20% HFC-125 and from 40% to 75% HFO-1234ze, and preferably from 25% to 40% HFC-32, from 5% to 20% HFC-125 and from 40% to 70% HFO-1234ze;

for composition 2): from 15% to 35% HFC-32, from 5% to 20% HFC-125 and from 45% to 80% HFO-1234yf, and preferably from 18% to 25% HFC-32, from 8% to 20% HFC-125 and from 55% to 74% HFO-1234yf.

In the "low-temperature refrigeration" processes mentioned above, the inlet temperature of the heat transfer fluid at the evaporator is preferably from −45° C. to −15° C., especially from −40° C. to −20° C. and more particularly preferably from −35° C. to −25° C., for example about −30° C.; and the temperature of the start of condensation of the heat transfer fluid at the condenser is preferably from 25° C. to 80° C., especially from 30° C. to 60° C. and more particularly preferably from 35° C. to 55° C., for example about 40° C.

In the "moderate-temperature cooling" processes mentioned above, the inlet temperature of the heat transfer fluid at the evaporator is preferably from −20° C. to 10° C., especially from −15° C. to 5° C. and more particularly preferably from −10° C. to 0° C., for example about −5° C.; and the temperature of the start of condensation of the heat transfer fluid at the condenser is preferably from 25° C. to 80° C., especially from 30° C. to 60° C. and more particularly preferably from 35° C. to 55° C., for example about 50° C. These processes may be refrigeration or air-conditioning processes.

In the "moderate-temperature heating" processes mentioned above, the inlet temperature of the heat transfer fluid at the evaporator is preferably from −20° C. to 10° C., especially from −15° C. to 5° C. and more particularly preferably from −10° C. to 0° C., for example about −5° C.; and the temperature of the start of condensation of the heat transfer fluid at the condenser is preferably from 25° C. to 80° C., especially from 30° C. to 60° C. and more particularly preferably from 35° C. to 55° C., for example about 50° C.

The heat transfer fluids mentioned above are not quasi-azeotropic and are highly efficient when they are correctly coupled with a counter-current heat exchanger (with an approximately constant difference in temperature with the second fluid in the exchanger).

Each heat transfer fluid above may be mixed with one or more additives to give the heat transfer composition effectively circulating in the vapor compression circuit. The additives may be chosen especially from lubricants, stabilizers, surfactants, tracer agents, fluorescers, odorants and solubilizers, and mixtures thereof.

The stabilizer(s), when they are present, preferably represent not more than 5% by mass in the heat transfer composition. Among the stabilizers, mention may be made especially of nitromethane, ascorbic acid, terephthalic acid, azoles such as tolutriazole or benzotriazole, phenolic compounds such as tocopherol, hydroquinone, t-butylhydroquinone, 2,6-di-tert-butyl-4-methylphenol, epoxides (optionally fluorinated or perfluorinated alkyl or alkenyl or aromatic) such as n-butyl glycidyl ether, hexanediol diglycidyl ether, allyl glycidyl ether, butylphenyl glycidyl ether, phosphites, phosphonates, thiols and lactones.

Lubricants that may especially be used include oils of mineral origin, silicone oils, paraffins, naphthenes, synthetic paraffins, alkylbenzenes, poly-α-olefins, polyalkylene glycols, polyol esters and/or polyvinyl ethers.

As tracer agents (capable of being detected), mention may be made of hydrofluorocarbons, deuterated hydrofluorocarbons, deuterated hydrocarbons, perfluorocarbons, fluoroethers, brominated compounds, iodinated compounds, alcohols, aldehydes, ketones and nitrous oxide, and combinations thereof. The tracer agent is different than the heat transfer compound(s) of which the heat transfer fluid is composed.

Solubilizers that may be mentioned include hydrocarbons, dimethyl ether, polyoxyalkylene ethers, amides, ketones, nitriles, chlorocarbons, esters, lactones, aryl ethers, fluoroethers and 1,1,1-trifluoroalkanes. The solubilizer is different than the heat transfer compound(s) of which the heat transfer fluid is composed.

Fluorescers that may be mentioned include naphthalimides, perylenes, coumarins, anthracenes, phenanthracenes, xanthenes, thioxanthenes, naphthoxanthenes and fluoresceins, and derivatives and combinations thereof.

Odorants that may be mentioned include alkyl acrylates, allyl acrylates, acrylic acids, acryl esters, alkyl ethers, alkyl esters, alkynes, aldehydes, thiols, thioethers, disulfides, allylisothiocyanates, alkanoic acids, amines, norbornenes, norbornene derivatives, cyclohexene, heterocyclic aromatic compounds, ascaridol and o-methoxy(methyl)phenol, and combinations thereof.

The compositions according to the invention may also be useful as expanders, aerosols or solvents.

EXAMPLES

The examples that follow illustrate the invention without limiting it.

Example 1

Method for Calculating the Properties of the Heat Transfer Fluids in the Various Envisioned Configurations The RK-Soave equation is used to calculate the densities, enthalpies, entropies and liquid vapor equilibrium data of the mixtures. The use of this equation requires knowledge of the properties of the pure substances used in the mixtures in question and also the interaction coefficients for each binary.

The data required for each pure substance are the boiling point, the critical temperature and the critical pressure, the pressure curve as a function of the temperature from the boiling point up to the critical point, the saturated liquid density and the saturated vapor density as a function of the temperature.

The data for HFCs are published in ASHRAE Handbook 2005, chapter 20, and are also available under Refrop (software developed by NIST for calculating the properties of coolant fluids).

The data of the temperature-pressure curve for the HFOs are measured by the static method. The critical temperature and the critical pressure are measured with a C80 calorimeter sold by Setaram. The densities, at saturation as a function of the temperature, are measured by the vibrating-tube densimeter technique developed by the laboratories of the Ecole des Mines de Paris.

The RK-Soave equation uses binary interaction coefficients to represent the behavior of the products as mixtures. The coefficients are calculated as a function of the liquid vapor equilibrium experimental data.

The technique used for the liquid vapor equilibrium measurements is the analytical static cell method. The equilibrium cell comprises a sapphire tube and is equipped with two ROLSITM electromagnetic samplers. It is immersed in a cryothermostatic bath (HUBER HS40). A field-driven magnetic stirrer rotating at variable speed is used to accelerate the arrival at equilibrium. The analysis of the samples is performed by gas chromatography (HP5890 series II) using a katharometer (TCD).

The liquid vapor equilibrium measurements on the binary HFC-32/HFO-1234ze are performed for the following isotherm: 15° C.

The liquid vapor equilibrium measurements on the binary HFC-32/HFO-1234yf are performed for the following isotherms: 70° C., 30° C., −10° C.

The liquid vapor equilibrium data for the binary HFC-32/HFC-125 are available under Refprop. Three isotherms (−30° C., 0° C. and 30° C.) are used to calculate the interaction coefficients for this binary.

The liquid vapor equilibrium measurements on the binary HFC-125/HFO-1234yf are performed for the following isotherms: −15° C., 0° C.

The liquid vapor equilibrium measurements on the binary HFC-125/HFO-1234ze are performed for the following isotherms: 25° C., 0° C.

A compression system equipped with an evaporator and counter-current condenser, a screw compressor and a pressure reducer is considered.

The system operates with 15° C. of overheating and 5° C. of undercooling. The minimum temperature difference between the secondary fluid and the coolant fluid is considered of the order of 5° C.

The isentropic yield of the compressors is a function of the compression rate. This yield is calculated according to the following equation:

$$\eta_{isen} = a - b(\tau - c)^2 - \frac{d}{\tau - e} \quad (1)$$

For a screw compressor, the constants a, b, c, d and e of equation (1) of the isentropic yield are calculated according to the standard data published in the *Handbook of air conditioning and refrigeration*, page 11.52.

The coefficient of performance (COP) is defined as being the working power provided by the system to the power provided or consumed by the system.

The Lorenz coefficient of performance (COPLorenz) is a reference coefficient of performance. It is a function of temperatures and is used to compare the COPs of different fluids.

The Lorenz coefficient of performance is defined as follows (the temperatures T are in K):

$$T_{mean}^{condenser} = T_{inlet}^{condenser} - T_{outlet}^{condenser} \quad (2)$$

$$T_{mean}^{evaporator} = T_{outlet}^{evaporator} - T_{inlet}^{evaporator} \quad (3)$$

The Lorenz COP in the case of conditioned air and of refrigeration is:

$$COPlorenz = \frac{T_{mean}^{evaporator}}{T_{mean}^{condenser} - T_{mean}^{evaporator}} \quad (4)$$

The Lorenz COP in the case of heating is:

$$COPlorenz = \frac{T_{mean}^{condenser}}{T_{mean}^{condenser} - T_{mean}^{evaporator}} \quad (5)$$

For each composition, the coefficient of performance of the Lorenz cycle is calculated as a function of the corresponding temperatures.

In low-temperature refrigeration mode, the compression system operates between a coolant fluid inlet temperature at the evaporator of −30° C. and a coolant fluid inlet temperature at the condenser of 40° C. The system provides cold at −25° C.

In moderate-temperature heating mode, the compression system operates between a coolant fluid inlet temperature at the evaporator of −5° C. and a temperature of the start of condensation of the coolant fluid at the condenser of 50° C. The system provides heat at 45° C.

In moderate-temperature cooling mode, the compression system operates between a coolant fluid inlet temperature at the evaporator of −5° C. and a temperature of the start of condensation of the coolant fluid at the condenser of 50° C. The system provides cold at 0° C.

In the tables that follow, "Evap. outlet temp." denotes the temperature of the fluid at the evaporator outlet, "Comp. outlet temp." denotes the temperature of the fluid at the compressor outlet, "Cond. outlet T" denotes the temperature of the fluid at the condenser outlet, "evap. P" denotes the pressure of the fluid in the evaporator, "cond. P" denotes the pressure of the fluid in the condenser, "Rate (p/p)" denotes the compression rate, "Glide" denotes the temperature glide, "comp. yield" denotes the compressor yield, "% CAP" denotes the volumetric capacity of the fluid relative to the reference fluid indicated on the first line, and "% COP/COPLorenz" denotes the ratio of the COP of the system relative to the COP of the corresponding Lorenz cycle.

Example 2

Results for a Low-Temperature Refrigeration, Comparison with R404a

HFC-32/HFC-125/HFO-1234ze mixture:

| Composition (%) | | | Evap. outlet temp.(°C.) | Comp. outlet temp.(°C.) | Cond. outlet T (°C.) | Evap. P (bar) | Cond. P (bar) | Rate (p/p) | Glide | Comp. yield | % CAP | %COP/COP-Lorenz |
|---|---|---|---|---|---|---|---|---|---|---|---|---|
| R404A | | | −30 | 100 | 40 | 2.1 | 18.1 | 8.8 | 0.46 | 53.8 | 100 | 32 |
| HFC-32 | HFC-125 | HFO-1234ze | | | | | | | | | | |
| 30 | 50 | 20 | −25 | 117 | 35 | 2.2 | 18.4 | 8.2 | 5.14 | 58.1 | 131 | 38 |
| 23 | 25 | 52 | −23 | 112 | 32 | 1.6 | 13.4 | 8.4 | 7.36 | 56.9 | 103 | 40 |
| 35 | 8 | 57 | −22 | 121 | 32 | 1.7 | 14.0 | 8.2 | 7.86 | 58.4 | 113 | 41 |
| 40 | 8 | 52 | −22 | 125 | 32 | 1.8 | 14.9 | 8.1 | 7.70 | 59.2 | 121 | 42 |
| 35 | 12 | 53 | −22 | 121 | 32 | 1.8 | 14.4 | 8.2 | 7.73 | 58.7 | 116 | 41 |
| 40 | 12 | 48 | −22 | 124 | 32 | 1.9 | 15.3 | 8.1 | 7.53 | 59.4 | 124 | 42 |
| 30 | 16 | 54 | −22 | 117 | 32 | 1.7 | 13.8 | 8.3 | 7.67 | 58.0 | 110 | 41 |
| 35 | 16 | 49 | −22 | 120 | 32 | 1.8 | 14.7 | 8.1 | 7.58 | 59.0 | 118 | 41 |
| 40 | 16 | 44 | −23 | 124 | 32 | 1.9 | 15.7 | 8.1 | 7.32 | 59.6 | 126 | 42 |
| 30 | 20 | 50 | −22 | 117 | 32 | 1.7 | 14.2 | 8.2 | 7.56 | 58.4 | 113 | 41 |
| 35 | 20 | 45 | −23 | 120 | 32 | 1.9 | 15.2 | 8.1 | 7.41 | 59.3 | 121 | 41 |
| 40 | 20 | 40 | −23 | 124 | 33 | 2.0 | 16.1 | 8.1 | 7.08 | 59.6 | 129 | 41 |

In the preceding table, as in the following tables, the grayed lines correspond to the compositions disclosed in documents US 2009/0 250 650 or WO 2010/002 014 and the following lines correspond to the compositions according to the invention.

HFC-32/HFC-125/HFO-1234yf mixture:

| Composition (%) | | | Evap. outlet temp.(°C.) | Comp. outlet temp.(°C.) | Cond. outlet T (°C.) | Evap. P (bar) | Cond. P (bar) | Rate (p/p) | Glide | Comp. yield | % CAP | %COP/COP-Lorenz |
|---|---|---|---|---|---|---|---|---|---|---|---|---|
| R404A | | | −30 | 100 | 40 | 2.1 | 18.1 | 8.8 | 0.46 | 53.8 | 100 | 32 |
| HFO-1234yf | HFC-32 | HFC-125 | | | | | | | | | | |
| 25 | 25 | 50 | −28 | 114 | 37 | 2.3 | 19.7 | 8.6 | 2.39 | 55.7 | 125 | 35 |
| 60 | 15 | 25 | −26 | 98 | 34 | 1.7 | 14.7 | 8.5 | 3.84 | 56.5 | 99 | 37 |
| 72 | 20 | 8 | −25 | 100 | 33 | 1.7 | 14.4 | 8.3 | 4.63 | 58.1 | 102 | 39 |
| 70 | 22 | 8 | −25 | 101 | 33 | 1.8 | 14.8 | 8.2 | 4.73 | 58.5 | 106 | 39 |
| 67 | 25 | 8 | −25 | 103 | 33 | 1.9 | 15.4 | 8.1 | 4.79 | 59.0 | 111 | 39 |
| 62 | 30 | 8 | −25 | 108 | 34 | 2.0 | 16.5 | 8.1 | 4.68 | 59.2 | 119 | 39 |
| 70 | 18 | 12 | −26 | 99 | 33 | 1.7 | 14.3 | 8.3 | 4.37 | 57.4 | 100 | 38 |
| 68 | 20 | 12 | −25 | 100 | 33 | 1.8 | 14.7 | 8.3 | 4.50 | 58.0 | 104 | 38 |
| 66 | 22 | 12 | −25 | 102 | 33 | 1.8 | 15.1 | 8.2 | 4.58 | 58.3 | 107 | 39 |
| 63 | 25 | 12 | −25 | 104 | 33 | 1.9 | 15.8 | 8.2 | 4.61 | 58.7 | 113 | 39 |

-continued

| HFC-32/HFC-125/HFO-1234yf mixture: | | | | | | | | | | | | |
|---|---|---|---|---|---|---|---|---|---|---|---|---|
| 66 | 18 | 16 | -26 | 99 | 33 | 1.8 | 14.6 | 8.3 | 4.27 | 57.4 | 101 | 38 |
| 64 | 20 | 16 | -26 | 101 | 33 | 1.8 | 15.0 | 8.3 | 4.37 | 57.8 | 105 | 38 |
| 62 | 22 | 16 | -26 | 102 | 33 | 1.9 | 15.5 | 8.2 | 4.43 | 58.2 | 109 | 38 |
| 59 | 25 | 16 | -26 | 105 | 34 | 2.0 | 16.1 | 8.2 | 4.43 | 58.4 | 114 | 38 |
|  |  |  |  |  |  |  |  |  |  |  |  |  |
| 62 | 18 | 20 | -26 | 100 | 33 | 1.8 | 15.0 | 8.4 | 4.16 | 57.3 | 103 | 38 |
| 60 | 20 | 20 | -26 | 101 | 33 | 1.9 | 15.4 | 8.3 | 4.24 | 57.7 | 107 | 38 |
| 58 | 22 | 20 | -26 | 103 | 34 | 1.9 | 15.8 | 8.3 | 4.27 | 58.0 | 110 | 38 |
| 55 | 25 | 20 | -26 | 106 | 34 | 2.0 | 16.5 | 8.2 | 4.24 | 58.2 | 115 | 38 |

Example 3

Results for a Moderate-Temperature Cooling, Comparison with HFC-134a

| HFC-32/HFC-125/HFO-1234ze mixture: | | | | | | | | | | | | |
|---|---|---|---|---|---|---|---|---|---|---|---|---|
| Composition (%) | | | Evap. outlet temp. (° C.) | Comp. outlet temp. (° C.) | Cond. outlet T (° C.) | Evap. P (bar) | Cond. P (bar) | Rate (p/p) | Glide | Comp. yield | % CAP | % COP/ COP-Lorenz |
|  | R134a |  | -5 | 81 | 50 | 2.4 | 13.2 | 5.4 | 0.00 | 75.9 | 100 | 54 |
| HFC-32 | HFC-125 | HFO-1234ze |  |  |  |  |  |  |  |  |  |  |
| 5 | 80 | 15 | -1 | 74 | 44 | 2.5 | 12.2 | 4.8 | 4.02 | 78.5 | 106 | 56 |
| 5 | 18 | 77 | -1 | 74 | 44 | 2.6 | 12.4 | 4.7 | 4.27 | 78.7 | 109 | 56 |
| 5 | 20 | 75 | -1 | 74 | 44 | 2.7 | 12.6 | 4.7 | 4.42 | 78.8 | 111 | 56 |
| 10 | 5 | 85 | 0 | 76 | 43 | 2.7 | 12.5 | 4.6 | 5.10 | 79.1 | 116 | 58 |
| 10 | 15 | 75 | 1 | 77 | 43 | 2.9 | 13.3 | 4.5 | 5.52 | 79.5 | 124 | 57 |
| 10 | 18 | 72 | 1 | 77 | 43 | 3.0 | 13.6 | 4.5 | 5.64 | 79.6 | 127 | 57 |
| 10 | 20 | 70 | 1 | 76 | 43 | 3.1 | 13.7 | 4.5 | 5.72 | 79.6 | 128 | 57 |
| 15 | 5 | 80 | 1 | 79 | 42 | 3.1 | 13.5 | 4.4 | 6.32 | 79.8 | 132 | 58 |
| 15 | 15 | 70 | 1 | 79 | 42 | 3.3 | 14.4 | 4.3 | 6.43 | 80.0 | 139 | 58 |
| 15 | 18 | 67 | 1 | 79 | 42 | 3.4 | 14.7 | 4.3 | 6.47 | 80.1 | 142 | 58 |
| 15 | 20 | 65 | 2 | 79 | 42 | 3.5 | 14.9 | 4.3 | 6.50 | 80.1 | 144 | 58 |
| 20 | 5 | 75 | 2 | 81 | 42 | 3.4 | 14.6 | 4.3 | 7.01 | 80.2 | 146 | 59 |
| 20 | 15 | 65 | 2 | 81 | 42 | 3.7 | 15.5 | 4.2 | 6.95 | 80.4 | 154 | 58 |

Example 4

Results for a Moderate-Temperature Heating, Comparison with HFC-134a

| HFC-32/HFC-125/HFO-1234ex mixture: | | | | | | | | | | | | |
|---|---|---|---|---|---|---|---|---|---|---|---|---|
| Composition (%) | | | Evap. outlet temp. (° C.) | Comp. outlet temp. (° C.) | Cond. outlet T (° C.) | Evap. P (bar) | Cond. P (bar) | Rate (p/p) | Glide | Comp. yield | % CAP | % COP/ COP-Lorenz |
|  | R134a |  | -5 | 81 | 50 | 2.4 | 13.2 | 5.4 | 0.00 | 75.9 | 100 | 63 |
| HFC-32 | HFC-125 | HFO-1234ze |  |  |  |  |  |  |  |  |  |  |
| 5 | 15 | 80 | -1 | 74 | 44 | 2.5 | 12.2 | 4.8 | 4.02 | 78.5 | 103 | 65 |
| 5 | 18 | 77 | -1 | 74 | 44 | 2.6 | 12.4 | 4.7 | 4.27 | 78.7 | 106 | 65 |

-continued

HFC-32/HFC-125/HFO-1234ex mixture:

| Composition (%) | | | Evap. outlet temp. (°C.) | Comp. outlet temp. (°C.) | Cond. outlet T (°C.) | Evap. P (bar) | Cond. P (bar) | Rate (p/p) | Glide | Comp. yield | % CAP | % COP/COP-Lorenz |
|---|---|---|---|---|---|---|---|---|---|---|---|---|
| 5  | 20 | 75 | −1 | 74 | 44 | 2.7 | 12.6 | 4.7 | 4.42 | 78.8 | 108 | 65 |
| 10 | 5  | 85 | 0  | 76 | 43 | 2.7 | 12.5 | 4.6 | 5.10 | 79.1 | 110 | 66 |
| 10 | 15 | 75 | 1  | 77 | 43 | 2.9 | 13.3 | 4.5 | 5.52 | 79.5 | 118 | 66 |
| 10 | 18 | 72 | 1  | 77 | 43 | 3.0 | 13.6 | 4.5 | 5.64 | 79.6 | 121 | 66 |
| 10 | 20 | 70 | 1  | 76 | 43 | 3.1 | 13.7 | 4.5 | 5.72 | 79.6 | 123 | 66 |
| 15 | 5  | 80 | 1  | 79 | 42 | 3.1 | 13.5 | 4.4 | 6.32 | 79.8 | 124 | 66 |
| 15 | 15 | 70 | 1  | 79 | 42 | 3.3 | 14.4 | 4.3 | 6.43 | 80.0 | 132 | 66 |
| 15 | 18 | 67 | 1  | 79 | 42 | 3.4 | 14.7 | 4.3 | 6.47 | 80.1 | 135 | 66 |
| 15 | 20 | 65 | 2  | 79 | 42 | 3.5 | 14.9 | 4.3 | 6.50 | 80.1 | 136 | 66 |
| 20 | 5  | 75 | 2  | 81 | 42 | 3.4 | 14.6 | 4.3 | 7.01 | 80.2 | 137 | 66 |
| 20 | 15 | 65 | 2  | 81 | 42 | 3.7 | 15.5 | 4.2 | 6.95 | 80.4 | 145 | 66 |

Example 5

Results for a Moderate-Temperature Cooling, Comparison with R404a and R407c

HFC-32/HFC-125/HFO-1234ze mixture:

| Composition (%) | | | Evap. outlet temp.(°C.) | Comp. outlet temp.(°C.) | Cond. outlet T (°C.) | Evap. P (bar) | Cond. P (bar) | Rate (p/p) | Glide | Comp. yield | % CAP | %COP/COP-Lorenz |
|---|---|---|---|---|---|---|---|---|---|---|---|---|
| R404A | | | −5 | 77 | 50 | 5.2 | 23.0 | 4.5 | 0.37 | 79.7 | 100 | 48 |
| R407C | | | −1 | 89 | 45 | 4.5 | 19.8 | 4.4 | 4.46 | 79.9 | 114 | 56 |
| HFC-32 | HFC-125 | HFO-1234ze | | | | | | | | | | |
| 30 | 50 | 20 | 0 | 89 | 45 | 5.7 | 23.6 | 4.2 | 4.88 | 80.5 | 133 | 54 |
| 23 | 25 | 52 | 2 | 83 | 42 | 4.2 | 17.3 | 4.1 | 7.04 | 80.6 | 109 | 58 |
| 25 | 5  | 70 | 2 | 84 | 42 | 3.8 | 15.7 | 4.2 | 7.38 | 80.5 | 102 | 59 |
| 25 | 15 | 60 | 2 | 84 | 42 | 4.0 | 16.7 | 4.1 | 7.23 | 80.6 | 107 | 59 |
| 30 | 5  | 65 | 3 | 87 | 42 | 4.1 | 16.8 | 4.1 | 7.54 | 80.7 | 110 | 59 |
| 40 | 5  | 55 | 2 | 92 | 42 | 4.7 | 18.9 | 4.0 | 7.45 | 80.9 | 124 | 59 |
| 40 | 15 | 45 | 2 | 92 | 43 | 5.0 | 20.1 | 4.0 | 7.04 | 80.9 | 129 | 58 |
| 40 | 18 | 42 | 2 | 92 | 43 | 5.1 | 20.5 | 4.0 | 6.88 | 80.9 | 131 | 58 |
| 40 | 20 | 40 | 2 | 92 | 43 | 5.2 | 20.8 | 4.0 | 6.77 | 80.9 | 132 | 58 |

Example 6

Results for a Moderate-Temperature Cooling, Comparison with R404a

HFC-32/HFC-125/HFO-1234yf mixture:

| Composition (%) | | | Evap. outlet temp.(°C.) | Comp. outlet temp.(°C.) | Cond. outlet T (°C.) | Evap. P (bar) | Cond. P (bar) | Rate (p/p) | Glide | Comp. yield | % CAP | %COP/COP-Lorenz |
|---|---|---|---|---|---|---|---|---|---|---|---|---|
| R404A | | | −5 | 77 | 50 | 5.2 | 23.0 | 4.5 | 0.37 | 79.7 | 100 | 48 |
| HFO-1234vf | HFC-32 | HFC-125 | | | | | | | | | | |
| 52 | 23 | 25 | −1 | 82 | 45 | 5.1 | 21.1 | 4.1 | 4.32 | 80.6 | 117 | 54 |
| 60 | 15 | 25 | −1 | 76 | 44 | 4.5 | 18.8 | 4.2 | 4.23 | 80.5 | 104 | 54 |

-continued

HFC-32/HFC-125/HFO-1234yf mixture:

| | | | | | | | | | | | | |
|---|---|---|---|---|---|---|---|---|---|---|---|---|
| 74 | 18 | 8 | 0 | 77 | 43 | 4.4 | 17.9 | 4.1 | 4.97 | 80.7 | 104 | 56 |
| 72 | 20 | 8 | 0 | 78 | 43 | 4.5 | 18.5 | 4.1 | 5.11 | 80.8 | 107 | 56 |
| 70 | 22 | 8 | 0 | 79 | 43 | 4.7 | 19.0 | 4.1 | 5.18 | 80.8 | 111 | 56 |
| 67 | 25 | 8 | 0 | 81 | 43 | 4.9 | 19.8 | 4.0 | 5.18 | 80.8 | 115 | 56 |
| 62 | 30 | 8 | 0 | 84 | 44 | 5.2 | 21.1 | 4.1 | 4.97 | 80.8 | 122 | 55 |
| 70 | 18 | 12 | 0 | 77 | 77 | 4.5 | 18.3 | 4.1 | 4.84 | 80.7 | 105 | 55 |
| 68 | 20 | 12 | 0 | 78 | 78 | 4.6 | 18.8 | 4.1 | 4.95 | 80.7 | 108 | 55 |
| 66 | 22 | 12 | 0 | 80 | 80 | 4.8 | 19.4 | 4.1 | 4.99 | 80.8 | 112 | 55 |
| 63 | 25 | 12 | 0 | 81 | 81 | 5.0 | 20.2 | 4.1 | 4.97 | 80.8 | 116 | 55 |
| 58 | 30 | 12 | 0 | 85 | 85 | 5.3 | 21.5 | 4.1 | 4.72 | 80.7 | 123 | 55 |
| 69 | 15 | 16 | -1 | 76 | 43 | 4.3 | 17.9 | 4.2 | 4.47 | 80.6 | 100 | 55 |
| 66 | 18 | 16 | 0 | 77 | 43 | 4.5 | 18.7 | 4.1 | 4.70 | 80.7 | 106 | 55 |
| 64 | 20 | 16 | 0 | 79 | 44 | 4.7 | 19.3 | 4.1 | 4.78 | 80.7 | 109 | 55 |
| 62 | 22 | 16 | 0 | 80 | 44 | 4.8 | 19.8 | 4.1 | 4.80 | 80.7 | 113 | 55 |
| 59 | 25 | 16 | 0 | 82 | 44 | 5.0 | 20.6 | 4.1 | 4.75 | 80.7 | 117 | 55 |
| 65 | 15 | 20 | -1 | 76 | 44 | 4.4 | 18.3 | 4.2 | 4.37 | 80.5 | 102 | 55 |
| 60 | 20 | 20 | 0 | 79 | 44 | 4.8 | 19.7 | 4.1 | 4.61 | 80.6 | 111 | 55 |
| 58 | 22 | 20 | 0 | 80 | 44 | 4.9 | 20.3 | 4.1 | 4.61 | 80.7 | 114 | 55 |

Example 7

Results for a Moderate-Temperature Heating, Comparison with R404a

HFC-32/HFC-125/HFO-1234yf mixture:

| Composition (%) | | | Evap. outlet temp.(°C.) | Comp. outlet temp.(°C.) | Cond. outlet T (°C.) | Evap. P (bar) | Cond. P (bar) | Rate (p/p) | Glide | Comp. yield | % CAP | %COP/COP-Lorenz |
|---|---|---|---|---|---|---|---|---|---|---|---|---|
| R404A | | | -5 | 77 | 50 | 5.2 | 23.0 | 4.5 | 0.37 | 79.7 | 100 | 48 |
| HFO-1234vf | HFC-32 | HFC-125 | | | | | | | | | | |
| 52 | 23 | 25 | -1 | 82 | 45 | 5.1 | 21.1 | 4.1 | 4.12 | 80.6 | 110 | 63 |
| 60 | 15 | 25 | -1 | 76 | 44 | 4.5 | 18.8 | 4.2 | 4.23 | 80.5 | 98 | 63 |
| 72 | 20 | 8 | 0 | 78 | 43 | 4.5 | 18.5 | 4.1 | 5.11 | 80.8 | 100 | 64 |
| 70 | 22 | 8 | 0 | 79 | 43 | 4.7 | 19.0 | 4.1 | 5.18 | 80.8 | 103 | 64 |
| 67 | 25 | 8 | 0 | 81 | 43 | 4.9 | 19.8 | 4.0 | 5.18 | 80.8 | 108 | 64 |
| 68 | 20 | 12 | 0 | 78 | 43 | 4.6 | 18.8 | 4.1 | 4.95 | 80.7 | 102 | 64 |
| 66 | 22 | 12 | 0 | 80 | 43 | 4.8 | 19.4 | 4.1 | 4.99 | 80.8 | 105 | 64 |
| 66 | 18 | 16 | 0 | 77 | 43 | 4.5 | 18.7 | 4.1 | 4.70 | 80.7 | 100 | 64 |

The invention claimed is:

1. A method comprising replacing an initial heat transfer fluid in a heat transfer installation comprising a vapor compression circuit containing the initial heat transfer fluid, said method comprising a step of replacing the initial heat transfer fluid in the vapor compression circuit with a final transfer fluid,
wherein the initial heat transfer fluid is R404a, R407c or HFC-134a, and
wherein the final transfer fluid comprises, in mass percent:
from 5% to 50% of difluoromethane;
from 2% to 20% of pentafluoroethane; and
from 30% to 90% of tetrafluoropropene, wherein the tetrafluoropropene is 1,3,3,3-tetrafluoropropene or 2,3,3,3-tetrafluoropropene.

2. The method as claimed in claim 1, in which the tetrafluoropropene is 1,3,3,3-tetrafluoropropene.

3. The method as claimed in claim 1, in which the tetrafluoropropene is 2,3,3,3-tetrafluoropropene.

4. The method as claimed in claim 1, in which the initial heat transfer fluid is R404a.

5. The method as claimed in claim 1, in which the initial heat transfer fluid is R407c.

6. The method as claimed in claim 1, in which the initial heat transfer fluid is HFC-134a.

7. The method as claimed in claim 1, wherein the initial heat transfer fluid is R404a, and wherein the final transfer fluid comprises, in mass percent:
from 15% to 35% of difluoromethane;
from 5% to 20% of pentafluoroethane; and
from 45% to 80% of 2,3,3,3-tetrafluoropropene.

8. The method as claimed in claim 1, wherein the initial heat transfer fluid is R404a, and
wherein the final transfer fluid comprises, in mass percent:
from 18% to 25% of difluoromethane;
from 8% to 20% of pentafluoroethane; and
from 55% to 74% of 2,3,3,3-tetrafluoropropene.

9. The method as claimed in claim 1, wherein the initial heat transfer fluid is R404a, and
wherein the final transfer fluid comprises, in mass percent:
from 15% to 50% of difluoromethane;
from 5% to 20% of pentafluoroethane; and
from 30% to 80% of 1,3,3,3-tetrafluoropropene.

10. The method as claimed in claim 1, wherein the initial heat transfer fluid is R404a, and
wherein the final transfer fluid comprises, in mass percent:
from 30% to 40% of difluoromethane;
from 8% to 20% of pentafluoroethane; and
40% to 62% of 1,3,3,3-tetrafluoropropene.

11. The method as claimed in claim 1, wherein the initial heat transfer fluid is R134a, and
wherein the final transfer fluid comprises, in mass percent:
from 5% to 30% of difluoromethane;
from 5% to 20% of pentafluoroethane; and
from 50% to 90% of 1,3,3,3-tetrafluoropropene.

12. The method as claimed in claim 1, wherein the initial heat transfer fluid is R134a, and
wherein the final transfer fluid comprises, in mass percent:
from 5% to 20% of difluoromethane;
from 5% to 20% of pentafluoroethane; and
from 60% to 90% of 1,3,3,3-tetrafluoropropene.

13. The method as claimed in claim 1, wherein the initial heat transfer fluid is R404a or R407c, and
wherein the final transfer fluid comprises, in mass percent:
from 20% to 40% of difluoromethane;
from 5% to 20% of pentafluoroethane; and
from 40% to 75% of 1,3,3,3-tetrafluoropropene.

14. The method as claimed in claim 1, wherein the initial heat transfer fluid is R404a or R407c, and
wherein the final transfer fluid comprises, in mass percent:
from 25% to 40% of difluoromethane;
from 5% to 20% of pentafluoroethane; and
from 40% to 70% of 1,3,3,3-tetrafluoropropene.

15. The method as claimed in claim 1, wherein the initial heat transfer fluid is R404a or R407c, and
wherein the final transfer fluid comprises, in mass percent:
from 15% to 35% of difluoromethane;
from 5% to 20% of pentafluoroethane; and
from 45% to 80% of 2,3,3,3-tetrafluoropropene.

16. The method as claimed in claim 1, wherein the initial heat transfer fluid is R404a or R407c, and
wherein the final transfer fluid comprises, in mass percent:
from 18% to 25% of difluoromethane;
from 8% to 20% of pentafluoroethane; and
from 55% to 74% of 2,3,3,3-tetrafluoropropene.

17. The method as claimed in claim 1, wherein the final transfer fluid further comprising one or more additives chosen from the group consisting of lubricants, stabilizers, surfactants, tracer agents, fluorescers, odorants and solubilizers, and mixtures thereof.

18. The method as claimed in claim 1, wherein the final transfer fluid consists of, in mass percent:
from 5% to 50% of difluoromethane;
from 2% to 20% of pentafluoroethane; and
from 30% to 90% of tetrafluoropropene, wherein the tetrafluoropropene is 1,3,3,3-tetrafluoropropene or 2,3,3,3-tetrafluoropropene,
and, optionally, one or more additives chosen from the group consisting of lubricants, stabilizers, surfactants, tracer agents, fluorescers, odorants and solubilizers, and mixtures thereof.

* * * * *